United States Patent [19]
Sisk et al.

[11] 3,792,840
[45] Feb. 19, 1974

[54] SUBMERGED TURBINE AERATOR
[75] Inventors: Francis J. Sisk, Pittsburgh, Pa.;
Chesley F. Garland, Tucson, Ariz.
[73] Assignee: Westinghouse Electric Corporation, Pittsburgh, Pa.
[22] Filed: June 15, 1971
[21] Appl. No.: 153,336

[52] U.S. Cl. .................................................. 261/93
[51] Int. Cl.............................................. B01f 03/04
[58] Field of Search. 261/87, 93; 209/169, 170, 168

[56] References Cited
UNITED STATES PATENTS
| 2,521,396 | 9/1950 | Moul | 261/93 |
| 2,750,328 | 6/1956 | Stimpson et al. | 261/93 X |
| 3,154,601 | 10/1964 | Kalinske et al. | 261/93 |
| 3,256,987 | 6/1966 | Isenhardt et al. | 261/93 X |
| 1,268,630 | 6/1918 | Ruth, Jr. | 261/87 |
| 1,998,694 | 4/1935 | Weinig | 261/87 |
| 2,243,302 | 5/1941 | Weinig | 261/93 |
| 2,393,976 | 2/1946 | Daman et al. | 209/169 |
| 2,609,097 | 9/1952 | Dering | 209/169 |
| 2,713,477 | 7/1955 | Daman | 261/87 |
| 2,767,965 | 10/1956 | Daman | 261/87 |
| 2,892,543 | 6/1959 | Daman | 209/169 |
| 2,944,802 | 7/1960 | Daman | 261/87 |
| 3,017,951 | 1/1962 | Wiley | 261/93 X |
| 3,536,305 | 10/1970 | Lefrancois | 261/93 |

Primary Examiner—Frank W. Lutter
Assistant Examiner—Vincent Gifford
Attorney, Agent, or Firm—J. R. Campbell

[57] ABSTRACT

A submerged aerator rotor for use with sparged air for water and waste treatment systems. The air is supplied evenly distributed azimuthally to the bottom of a circular shroud which is rotated by a vertical shaft from the surface of a treatment tank. The upper surface of the shroud is vaned with a clearance between the vane tip and the shroud edge.

1 Claim, 4 Drawing Figures 3,792,840

PATENTED FEB 19 1974 3,792,840

SUBMERGED TURBINE AERATOR

BACKGROUND OF THE INVENTION

This invention pertains to processes and apparatus for enhancing the mass transfer of oxygen from a sparged air system into a liquid medium, and more particularly to submerged turbine rotors for accomplishing same.

In water and waste treatment systems as for example the activated sludge sewage treatment process, one popular method of supplying oxygen for the aerobic metabolism of micro-organisms involves sparging air into a liquid below the plane of a submerged vaned rotor driven by a vertical shaft from above the liquid level. The geometry is generally such that the air passes through the vanes themselves.

It has been found that contrary to the usual view of such two-phase flow mechanics, the air is not dispersed in vane passage and entrained in liquid medium, but is rather separated into a film flow on the trailing face of the vanes and dispersed in a jet mixing flow exiting from the rotor tip. The air consequently encounters only a small fraction of the radially outward streaming liquid. The air insufflated liquid in the area of the rotor coalesces into a powerful central upwelling flow driven by percolation head and the air vents through the surface in a central boil while the accompanying liquid flows radially outward and sinks near the tank rim. In consequence, the path of the air to the surface is short and the contact time of the air with the liquid medium is less than might otherwise be the case. The mass transfer area and driving force are thus minimized.

Moreover, the power draw of a rotor with large air ventilated cavities behind the trailing faces of its vanes is much smaller than the power draw of the same rotor without such cavities since the presence of air considerably reduces the liquid flow and the vane drag coefficient. Thus, the drive must be specified for a considerably higher capacity than the normal operating power to permit operation of the rotor during an air supply casualty to prevent sludge buildup on the bottom of the tank.

SUMMARY OF THE INVENTION

The contacting time and accordingly the mass transfer driving force is maximized in accordance with this invention by the provision of a rotor with vanes only on the upper surface of the rotor platform and having vane tips suitably displaced from the edge of the platform or shroud.

Air is sparged from a ring onto the shroud at approximately the intersection of the shroud with a conical fairing projecting downwardly therefrom. The conical fairing serves to preserve the uniform azimuthal air distribution created by the sparge ring. The displacement of the vane tips from the shroud edge permits separation of the liquid vortex stream from the vanes before air flow is encountered and thus prohibits air induction into an attached vortex and thus onto the vane trailing face.

Air is accordingly delivered uniformly off the shroud underside into the underside of the radial liquid jet which is driven by the vanes on the shroud upper side. The air is dispersed by the shear flow which it encounters and is driven radially outward while rising in discrete bubbles through the liquid jet. By the time the air has freed itself from the jet entrainment and is capable of creating an upwelling flow due to its percolation head, it has been radially dispersed. The result is a ring of air insufflated liquid in upwelling flow at a large radial distance from the rotor. At the surface the air disengages and the liquid separates into an inner toroidal vortex which returns to the rotor eye and an outer torus which becomes a sinking flow at a large radius or at the tank rim. The air contacting time with the water is thus maximized for a given rotor power.

DESCRIPTION OF THE DRAWINGS

For a better understanding of the invention reference may be had to the accompanying illustrative drawings, in which.

DESCRIPTION OF A PREFERRED EMBODIMENT

Figure 1:
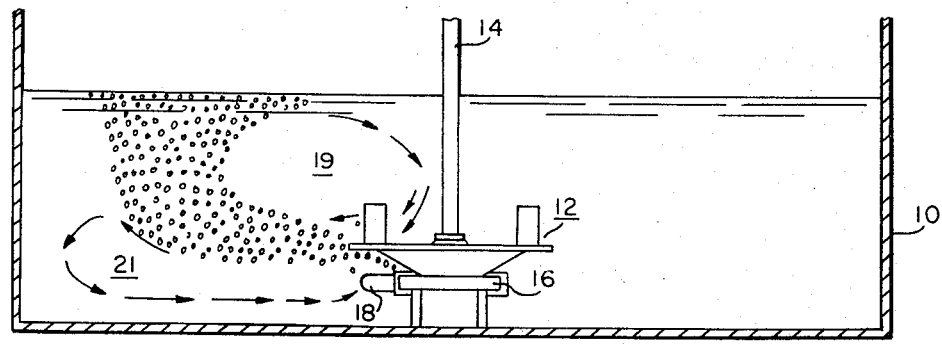
FIG. 1 shows a schematic cross-sectional elevation view of a tank having a submerged turbine aerator in accordance with this invention.

Referring to FIG. 1, there is shown a liquid containment tank 10 suitable for the treatment of water or waste water. A turbine aerator 12 is shown supported therein by a central vertical shaft 14. The turbine aerator 12 is supported for use in conjunction with sparged air which is evenly distributed azimuthally to same through a sparge ring 16 supplied with air through an inlet pipe 18.

Figure 3:
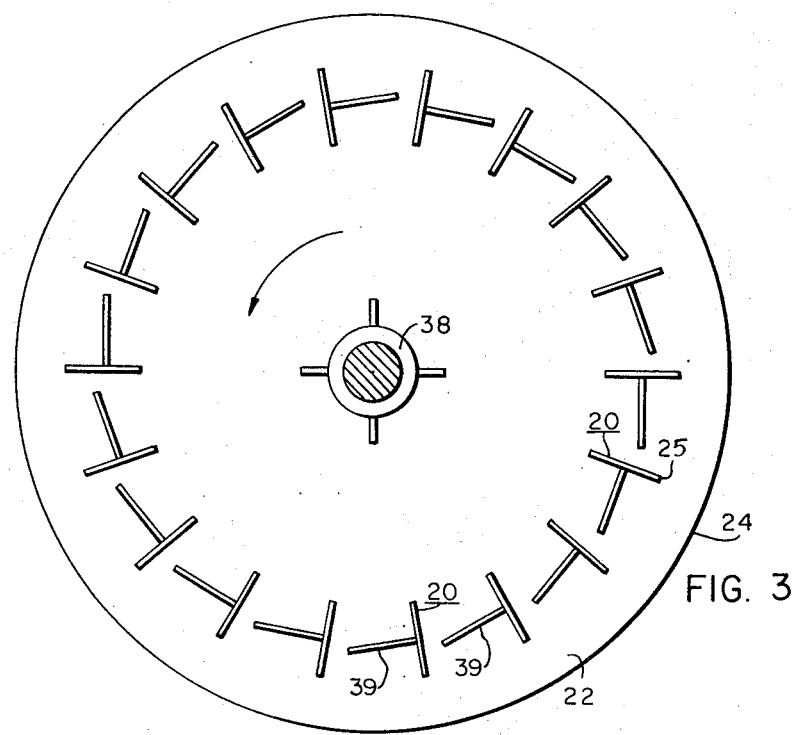
FIG. 3 is a plan view of the turbine aerator viewed from above.

In contrast with the prevalent design of turbine aerator systems, the turbine blades of this system are designed to operate in a single phase liquid medium. Accordingly, the turbine blades 20 of the turbine aerator 12 are mounted on the top surface of a flat circular shroud 22 and are displaced from the edge 24 thereof. More particularly, as can best be seen in FIG. 3, the tip 25 of each turbine blade 20 is displaced a substantial distance from the edge 24 of the shroud 22. The shroud 22 is also equipped with a conical lower fairing 26.

As previously indicated air is uniformly azimuthally distributed from a sparge ring 16 onto the lower surface of the shroud 22 at approximately the intersection of the shroud 22 and the conical fairing 26. The turbine aerator 12 is driven by a motor 30 and gear system 32 via a vertical shaft 34 connected via coupling 36 to a suitable fitting 38 affixed centrally of the shroud 22; as is well known to the art.

The rotation of the turbine aerator 12 in the single phase liquid medium causes a radially outward liquid jet to form above and outwardly of the shroud 22. Air bubbles from the sparge ring 16 are delivered uniformly from the shroud edge 24 into this jet stream and are driven radially outward while rising in discrete bubbles through the liquid jet. By the time the air has freed itself from the jet entrainment it has become radially dispersed. Accordingly, the path of any air bubble is much longer than it would have been had it passed through the turbine blades. This means that the air contacting time with the liquid medium has been greatly increased resulting in an increase in the mass transfer rate of oxygen to the water in the tank 10. FIG. 1 generally shows a typical path for the air bubbles and the main liquid streams. As can be seen, the liquid separates into an internal toroidal vortex 19 which generally returns to the eye of the turbine rotor 12 and at outer torus 21 which becomes a sinking flow adjacent the tank rim.

Figure 2:
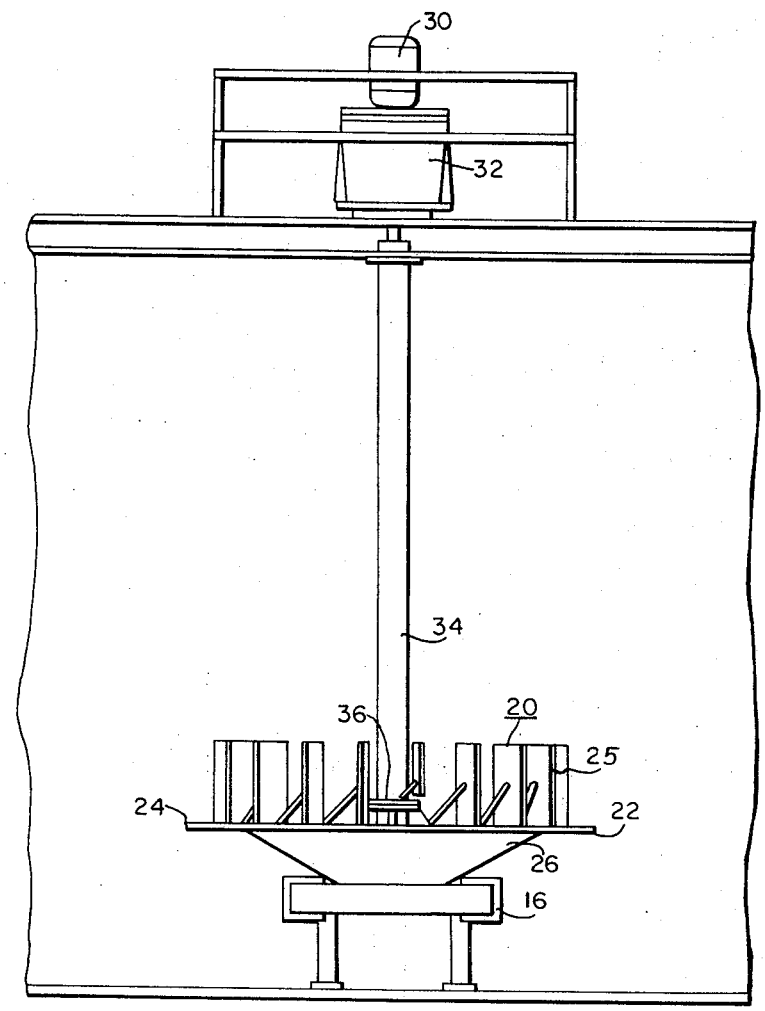
FIG. 2 is a cross-sectional elevation view enlarged to show details of the turbine aerator.
Figure 4:
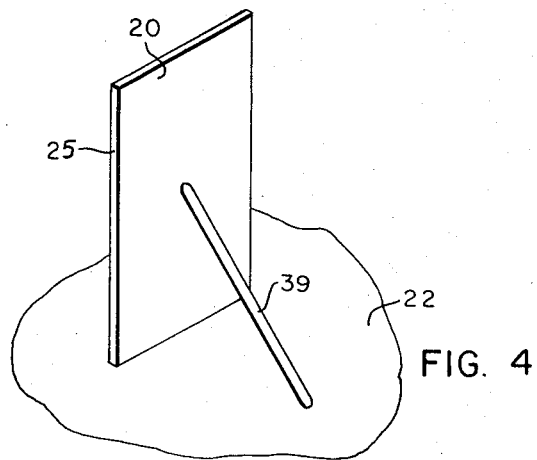
FIG. 4 is an expanded view of a vane of the aerator of FIG. 3 showing a means for supporting same.

The rotor vanes 20 are shown radially oriented and supported by support rods 39 welded both to the vanes 20 and the shroud 22; see FIG. 4. Although the vanes 20 are shown along radii of the circular shroud 22, they may be angled with respect thereto with a probable increase in efficiency. What is essentially required is that the impeller or vane portion of the aerator 12 work in a single phase liquid alone and discharge that liquid with a large radial velocity component and that the gas be delivered to this shear flow substantially uniformly and at a point sufficiently separated from the vanes 20 that the upwelling of the gas cannot cause the entrainment of the air bubbles on the suction side of the impeller vanes 20. This last desideratum is accomplished economically as can best be seen in FIG. 2 by separating the vane tips 25 from the edge 24 of the shroud 22 by a distance which is a substantial portion of the height and pitch of the vanes 22. FIG. 2 shows this distance to be approximately 50 percent of both the height and pitch of the vanes. Routine experimentation with various rotational velocities of the turbine aerator 12 and varying gas flow rates will indicate the separation distance required for any particular system. As is known, impeller blades generally have impeller tip vortices which extend some distance outwardly from the vane tips. An exception exists where the vanes are curved to closely fit the flow field. In this last mentioned case, the bubbles may be fed into the flow field at the tips of the vanes. Otherwise, the bubbles must enter the field outwardly of the vortices.

What we claim as our invention:

1. An aerator adapted for submerged operation comprising:
   a rotatable shaft supporting a flat shroud of circular configuration adapted for submergence in a liquid;
   a drive train connected to the other end of said shaft;
   impeller vanes mounted on the upper surface of said shroud;
   an inverted conical fairing attached to the underside of said shroud, said shroud extending radially beyond the outer end of said impeller vanes;
   air sparge means mounted beneath said shroud and concentrically disposed with respect to said conical fairing for azimuthally distributing air onto the lower surface of said shroud;
   whereby upon rotation of the impeller, a continuous liquid jet is directed radially outward of the shroud, and as the air spills from under the shroud into the jet, it is sheared into small bubbles which become dispersed in the liquid and provide maximum transfer of oxygen thereto.

* * * * *